United States Patent
Motwani et al.

(10) Patent No.: US 9,914,258 B2
(45) Date of Patent: Mar. 13, 2018

(54) METHODS FOR PRODUCING HOLLOW LIGHTWEIGHT FIBER REINFORCED PLASTIC HANDLES

(71) Applicant: BFG International, Manama (BH)

(72) Inventors: Anjal Motwani, Manama (BH); Samer Aljishi, Manama (BH)

(73) Assignee: BFG INTERNATIONAL, Manama (BH)

( * ) Notice: Subject to any disclaimer, the term of this patent is extended or adjusted under 35 U.S.C. 154(b) by 68 days.

(21) Appl. No.: 14/641,810

(22) Filed: Mar. 9, 2015

(65) Prior Publication Data

US 2016/0263812 A1 Sep. 15, 2016

(51) Int. Cl.
| | |
|---|---|
| *B29C 53/56* | (2006.01) |
| *B29C 53/82* | (2006.01) |
| *B29C 70/44* | (2006.01) |
| *B29L 23/00* | (2006.01) |
| *B29L 31/46* | (2006.01) |
| *B29C 53/58* | (2006.01) |

(52) U.S. Cl.
CPC .......... *B29C 53/824* (2013.01); *B29C 70/446* (2013.01); *B29C 53/582* (2013.01); *B29L 2023/22* (2013.01); *B29L 2031/463* (2013.01)

(58) Field of Classification Search
CPC .................................................... B29C 53/562
See application file for complete search history.

(56) References Cited

U.S. PATENT DOCUMENTS

| 5,080,850 A | * | 1/1992 | Holloway | B29C 70/443 156/145 |
|---|---|---|---|---|
| 2003/0094067 A1 | * | 5/2003 | Whiting | B62K 19/16 74/551.1 |
| 2006/0102487 A1 | * | 5/2006 | Parsons, II | C25D 7/00 205/183 |

* cited by examiner

*Primary Examiner* — Daniel H Lee
(74) *Attorney, Agent, or Firm* — patenttm.us

(57) ABSTRACT

A method of producing, for example, handles for using in rolling stock or other transport situations, employs a flexible core mould that is coated with an impregnated glass fiber. The coated core mould is placed into a tool for curing, whereupon the rubber core is pulled out of the center of the resulting handle member after curing. The method helps create 3D shapes of any form and cross section in a cost effective manner and using a standardized methodology and process. Further, the method enables creation of a hollow and lightweight part. The method allows use of standard glass fiber instead of more specialized braided fiber of the prior art.

20 Claims, 7 Drawing Sheets

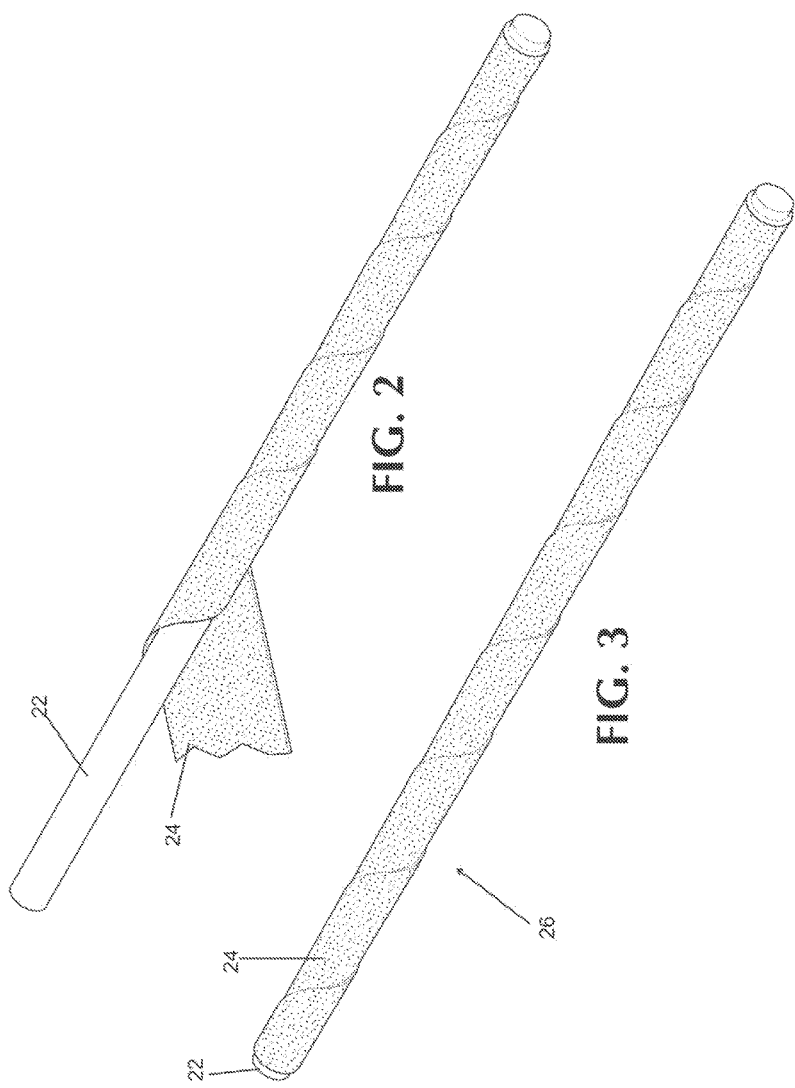

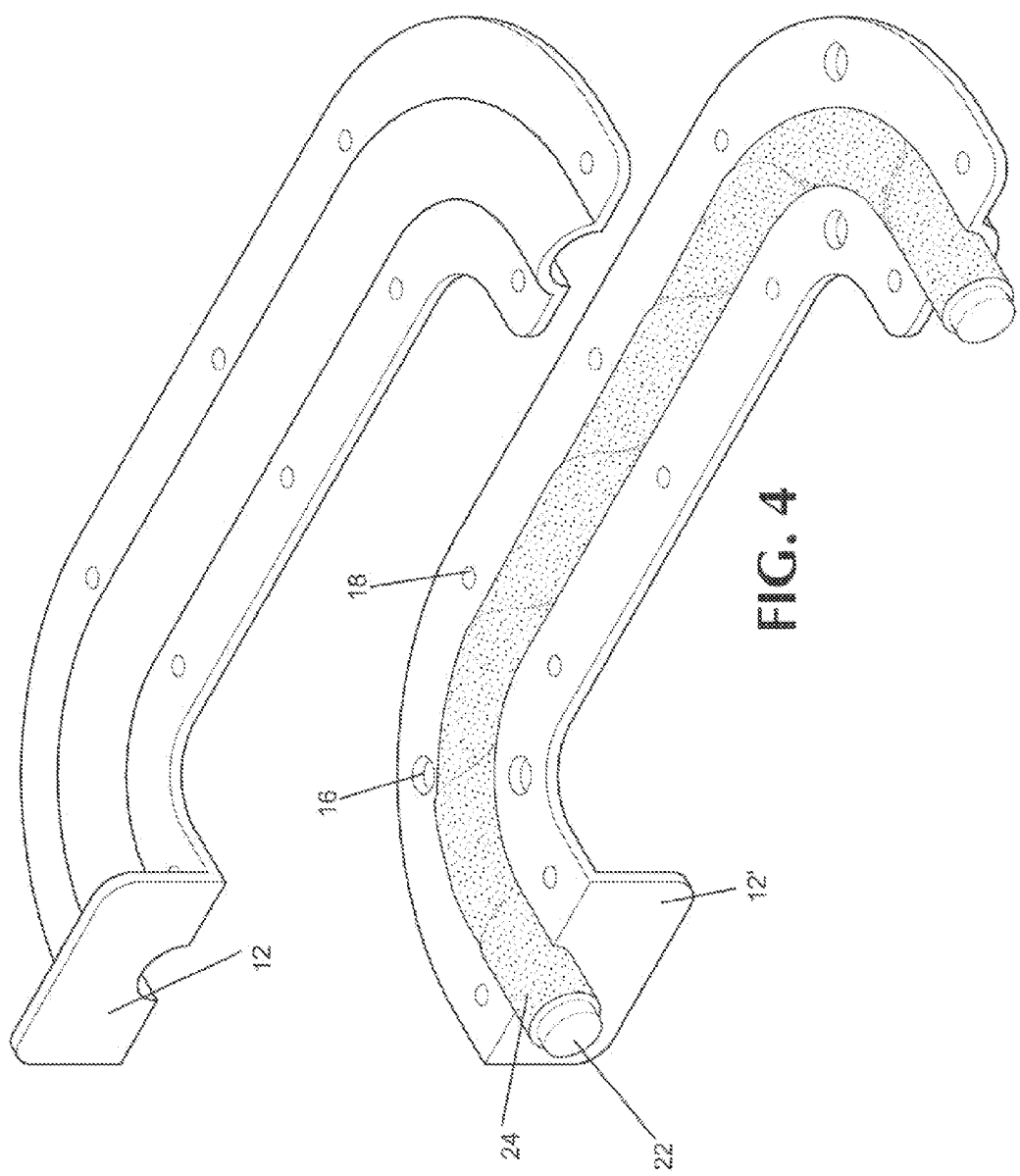

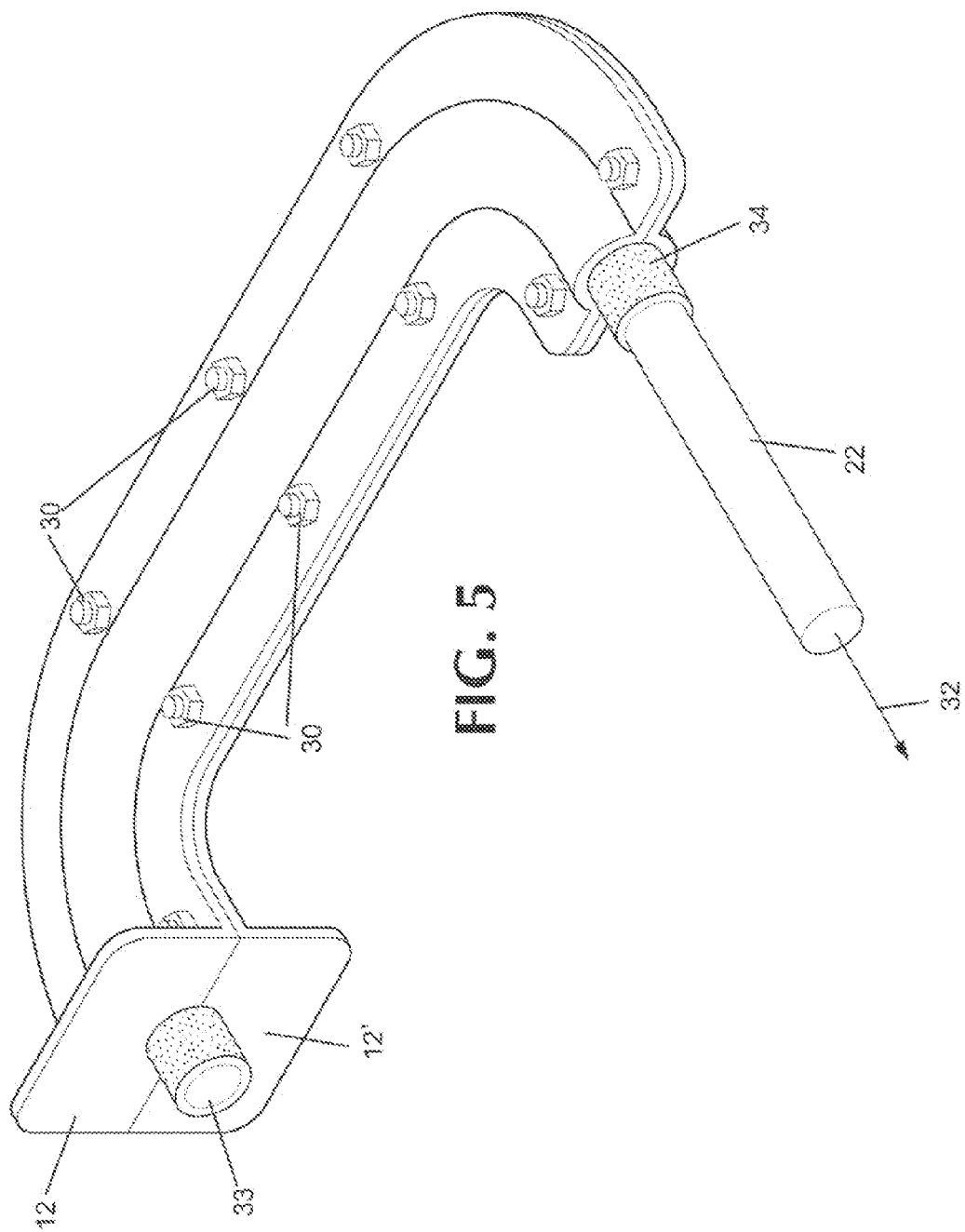

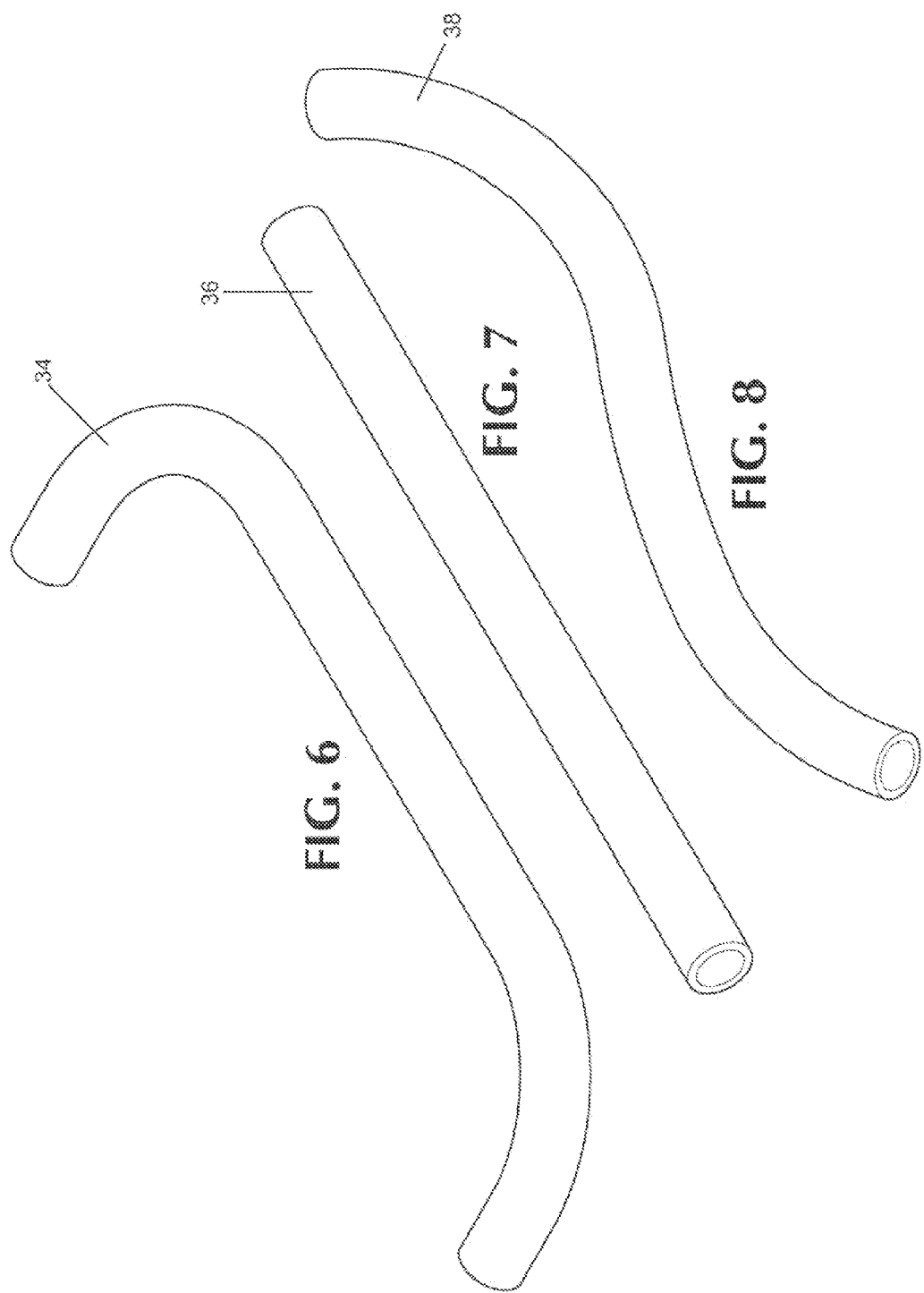

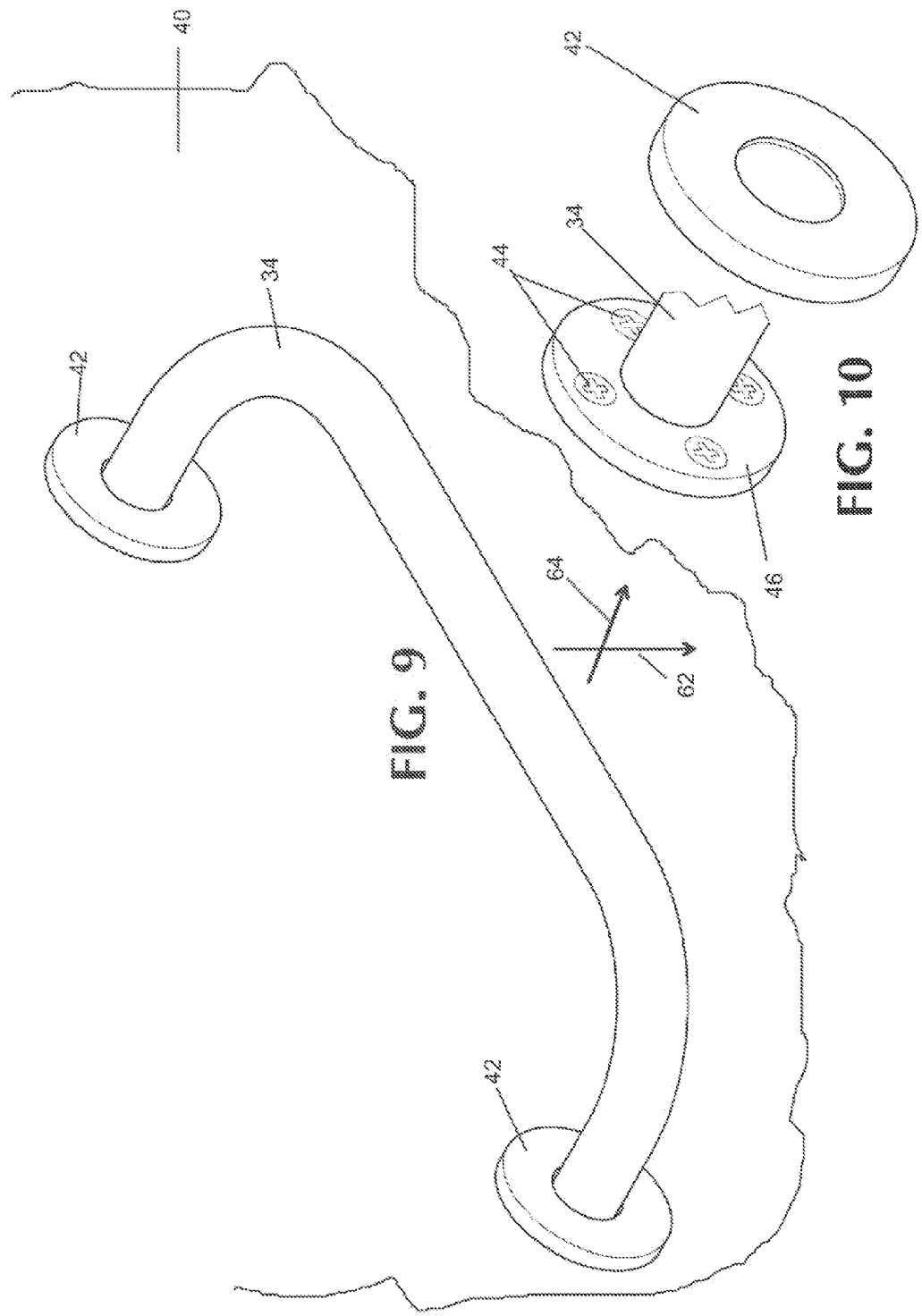

METHODS FOR PRODUCING HOLLOW LIGHTWEIGHT FIBER REINFORCED PLASTIC HANDLES

BACKGROUND

This disclosure relates to the process of manufacturing hollow seamless handles made of glass reinforced fibre material and the handles made thereby.

Handles, such as those used in rail or bus or other transportation applications, for passengers to grasp, are traditionally made in metal or are nylon based.

Fibre reinforced plastic (FRP) handles typically have to be made with a core inside as it is difficult to process and retain the shape of the handle without a core. Such handles are therefore heavier and difficult to process. Use of solid retained cores is especially difficult for complex 3D shapes, wherein the core has also to be manufactured to match the profile of the desired geometry, requiring an extra operation, time & cost.

Typically FRP industry has used special braided fibres for preparing any hollow sections. This braided fibre is then 'put onto' a mandrel to form the shape & wet out with resin. The facility to produce braided fibre is limited to a few manufacturers and needs a special type of machinery. Further, this material is only available in certain standard diameters and weight. This would limit the product thickness that can be offered and reduce the weight benefits that go along with the end product.

It is desirable to find a better way to make such handles in a variety of shapes.

SUMMARY

In accordance with the disclosure, a method of making hollow lightweight fibre reinforced plastic handles and the handles made thereby are provided. The new process allows the flexibility of use of more commonly available glass fabrics and the possibility of manufacturing the end product in a range of diameters and optimized weights.

Accordingly, it is an advantage of the present disclosure to provide an improved method of making handles.

It is a further advantage of the present disclosure to provide an improved method of producing hollow lightweight fibre reinforced plastic handles in a variety of configurations.

It is yet another advantage of the present disclosure to provide improved hollow lightweight fibre reinforced plastic handles in a variety of shapes and configurations.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

BRIEF DESCRIPTION OF THE DRAWINGS

FIG. 2 is a view of the steps of beginning to apply glass fibre to the flexible core;

FIG. 3 is a view of the completed step of rolling the fibre onto the flexible core;

FIG. 4 illustrates the placement of the rolled fibre/flexible core into the tool;

FIG. 5 illustrates the closure of the counter tool and clamping of the tools together as well as later removal of the core;

FIGS. 6-8 are examples of handle shapes that may be manufactured in accordance with the process;

FIG. 9 illustrates a handle configuration for which strength testing results are provided;

FIG. 10 illustrates one example of mounting a handle to a wall, etc.;

DETAILED DESCRIPTION

The system according to a preferred embodiment of the present disclosure provides a process that results in a handle that is seamless, lightweight and strong.

The process employs a flexible core made of material that can be removed from within the interior of the part after manufacture.

The process also allows for a method by which complex 3D shapes can be moulded, to the same level of accuracy every time. The same construction in metal would be done by heat treatment, welding, bending, etc., which would reduce the accuracy of the individual parts.

The selection of the raw materials and the fibre weave gives the part great rigidity & strength. Different resin matrices can be selected to offer a great level of fire retardancy, that is a must in transport applications, or other desired properties.

The handles so produced are corrosion resistance, having a very low thermal co-efficient as compared to metal handles.

They can be offered in all colours and a variety of finishes to suite the customer requirements. They can also be chrome finished to replicate the metal sheen produced by Stainless steel handles.

While the examples illustrated herein are circular in cross-section, it is also possible to create handles in other cross sectional shapes, such as rectangular, oval, half round, triangular, etc.

Joining of various 3D shapes to shapes to create one integrated structure is also possible while moulding.

Embedding of inserts in fixed locations to assist assembly/mounting operations is also feasible.

In accordance with the disclosure, production of lightweight, strong, hollow, easy to process and manufacture FRP handles for rolling stock applications (vehicles that move on a railway, wheeled vehicles used by businesses on roadways, etc.), is provided.

Figure 1:
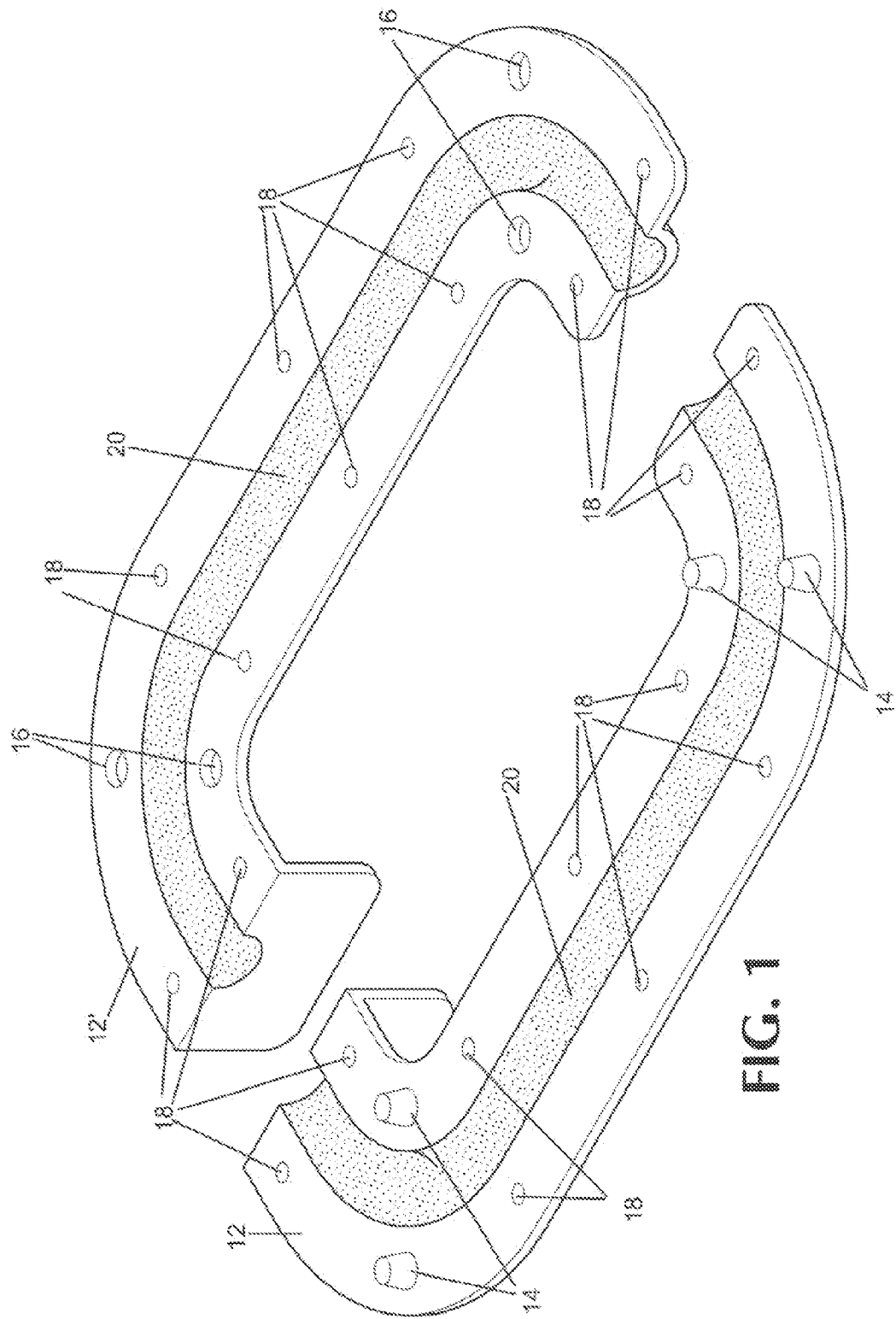
FIG. 1 is a perspective view of the mould/tooling used in the process.

Referring to FIG. 1, a view of the tooling used in the process, for a particular elongate C-shaped handle, a standard closed mould tool 12 with two mould halves (12, 12'), offset based on part thickness, is provided. The mould tool portions have registration pins 14 and corresponding registration pin receiving openings 16 to provide for proper alignment of the two tool faces in use. Multiple fastener receiving holes 18 are provided in the tools to allow bolting or other fasteners to secure the mould portions together during a curing phase.

Referring to FIGS. 1-4 together, the inner faces 20 of the mould tool portions are gel coated and a layer of low density glass fibre is impregnated with resin onto the gel coated surfaces.

Next, a pre-made cast flexible core representation 22 of the handle is provided. The casted material part can be substantially straight, for example, and does not need to follow the 3D profile of the tool or of the ultimate part to be constructed, as the shape of the tool will determine the end part configuration and the flexible casting will conform to the tool's shape. The cast will preferably be of cross sectional profile of the desired cross sectional profile of the finished handle, circular in the illustrated embodiment, and of slightly less diameter than the finished product's desired diameter as defined by the diameter of the space defined in the tools. The flexible core representation 22 is placed onto an impregnated glass fibre 24, and the impregnated glass fibre is then wrapped onto the flexible core (FIGS. 2, 3), for example by rolling the flexible core 22 so as to wrap the fibre around the mould, in the illustrated embodiment (alternatively the flexible core can be held stationary and the fibre wrapped around the mould), producing an impregnated fibre/flexible core combination 26.

The type of glass fibre used is such that it imparts structural properties & stiffness uniformly and is easy to drape around a small diameter core. This gives equalized strength in all directions and produces the seamless effect. Requirement of traditionally used braided fibre only is thus eliminated. Part thickness can be modified depending on the number of windings, which is also considered a limitation when using braided fibre in accordance with traditional processes.

The rolled fibre/flexible core combination 26 is lifted and placed in the coated tool cavity 20 (FIG. 4) of one of the tool portions 12, the counter tool portion 12' is moved (arrow 28) to close the two mould pieces together. Fasteners 30 may be installed in ones of the fastener receiving holes 18 (FIG. 5) to secure and hold the mould portions together and the part is left to cure.

Once cured, either before or after demoulding, the flexible core is pulled/stretched physically and pulled out, for example in the direction of arrow 32, from inside the cured moulded fibre handle part, leaving a hollow interior 33 to the handle. Being elastomer based in the particular embodiment, the core has self-release properties making its removal from the interior of the moulded fibre handle possible.

The moulded fibre handle part may then be trimmed, as the end portions may be uneven, finished for joint line marking and painted as required for the particular application.

FIGS. 6-8 are examples of particular handle shapes that have been constructed using the process, such as elongate C-shape 34 (FIG. 6), straight 36 (FIG. 7), and elongate S-curve 38 (FIG. 8). Of course, additional configurations are possible, and the illustrations are not meant to be exhaustive of the possible shapes.

FIG. 9 illustrates a handle 34 mounted to a surface such as a wall 40, wherein escutcheons 42 are provided to conceal fasteners 44 (visible in FIG. 10, where the escutcheon is removed) that secure the handle to the wall via mounting plate 46.

Figure 12:
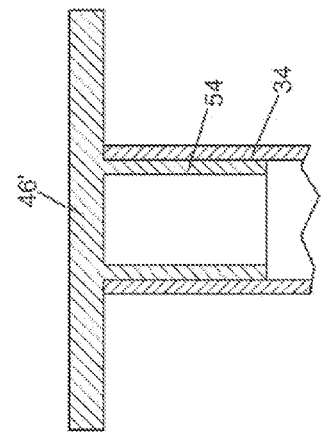
FIGS. 12 and 13 illustrate mounting configurations.
Figure 13:
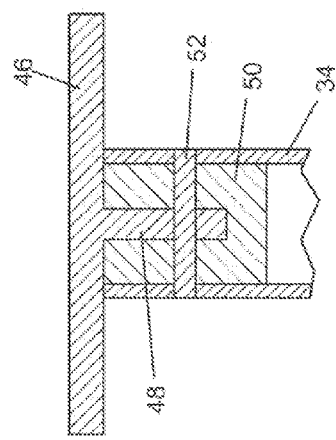

FIGS. 12 and 13 are cross sectional views of example mounting configurations, wherein in FIG. 12, mounting plate 46 includes an extending center pin member 48 and a mounting member 50 of approximate diameter of the inner diameter of the handle 34 has a corresponding receiving portion for the center pin. A cross pin 52 extends through the handle, the mounting member and a portion of the center pin 48 to lock the handle to the mounting member.

In FIG. 13, mounting plate 46' carries an extension member 54 (for example a tubular shape corresponding to the inner profile of the handle 34) that extends inwardly to the handle interior. Mounting can be accomplished by adhesive engagement between the handle and the extension member, or by fasteners extending through the handle and the extension member.

Figure 11:
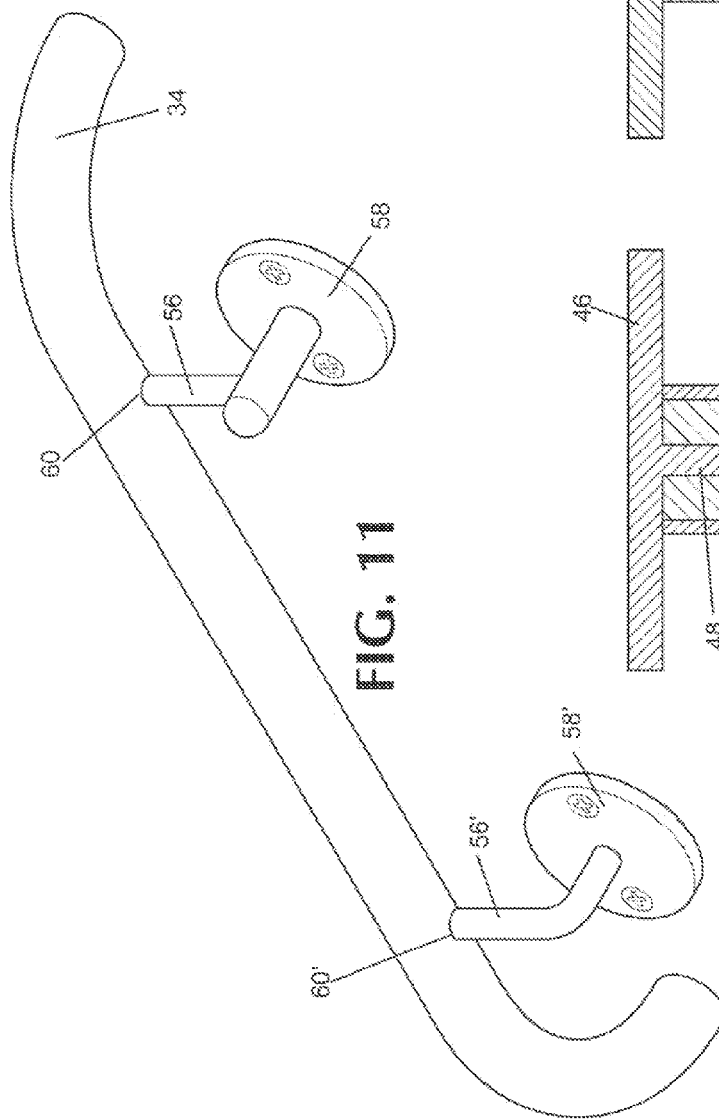
FIG. 11 illustrates another example of mounting a handle.

FIG. 11 illustrates a different mounting configuration, wherein mounting pins 56, 56' are carried by base plates 58, 58'. An opening 60, 60' in the handle 34 (formed for example by embedded inserts mentioned hereinabove) receives the mounting pins 56, 56' to hold the handle in position.

Illustrative Comparative Example

Table 1 shows comparison of weight per linear meter of a handle having a 33 mm outer diameter, for a handle made by the present process, a prior art nylon coated handle, and a prior art mild steel handle. As illustrated by the table, the prior art handles were 1.2 and 6 times heavier than the handle manufactured in accordance with the present disclosure.

TABLE 1

Weight comparisons

| TYPE | Weight/linear m - OD 33 mm | Weight Comparison |
|---|---|---|
| FRP handle of present method Fire retardant grade - 2.5~3 mm skin thickness | 600 grams | Baseline |
| Nylon coated handle | 700 grams | 1.2 times heavier |
| Mild steel handle - 3 mm skin thickness | 2.5 kilograms | 6 times heavier |

Fire Specification

Testing of example handles had the following results related to fire specification standards.

TABLE 2

Fire Specification

| Compliance | Standard | Rating Achieved |
|---|---|---|
| German | DIN 5510 | S4/SR2/ST2 |
| German/European | EN ISO 5659 (as per DIN 5510 - 2009) | FED at 30 min < 1 |
| French | NFF 16101 | M1 F3 |
| US | ASTM E 162 | FSI < 25 |
|  | ASTM E 662 | Ds (1.5) < 100 |
|  |  | Ds (4) < 200 |

Mechanical Strengths

Table 3 illustrates mechanical strength specifications.

TABLE 3

Mechanical Strengths

| Parameter | Standard | Specification |
|---|---|---|
| Product Thickness | NA | 2.5 +/- 0.5 mm |
| Tensile Strength | ASTM D 3039 | >150 MPa |
| Tensile Modulus | ASTM D 3039 | 8 Gpa |
| Flexural Strength | ASTM D 790 | >175 Mpa |
| Flexural Modulus | ASTM D 790 | 8 Gpa |

Strength Testing

Referring again to FIG. 9, a constructed handle 34 having a circular cross section, 33 mm outer diameter, was tested for strength properties, both for vertical 62 and horizontal 64 loads. Table 4 illustrates the results of strength testing performed on the test handle constructed by the method.

TABLE 4

Strength Testing

| Load | Target | Actual |
| --- | --- | --- |
| Vertical loading | 150 kgs | >200 kgs |
| Horizontal loading | 100 kgs | >250 kgs |

In accordance with the process/methods described herein, an improved handle construction method is provided, and the improved handle. The handle produced has many advantages over other handle types, such as being warm to the touch, having good abrasion resistance, and being very light and strong. The handle is fire retardant, corrosion resistant Handles and other parts can be moulded to complex 3D profiles, providing consistent dimensional profiles since the handles are moulded instead of being bent as with prior art. Handles can be manufactured in all colours with painted, smooth, matt and/or texture finish. The hollow profile handle is very light and strong.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A method of producing a hollow core handle, comprising:
   wrapping a resin impregnated fiber directly around a single pre-cast flexible core representation of the handle;
   curing the resin impregnated fiber in a mold having a desired shape, with the flexible core remaining inside the wrapped resin impregnated fiber while curing; and
   removing the flexible core once curing is complete, thereby providing a hollow core handle.

2. The method according to claim 1, further comprising the step of pre-coating mold surfaces that will contact the resin impregnated fiber.

3. The method according to claim 1 further comprising providing a color to the handle.

4. The method according to claim 1 further comprising providing a chrome finish to the handle.

5. The method according to claim 1 further comprising providing a metallic finish to the handle.

6. The method according to claim 1 wherein said curing step comprises placing the resin impregnated fiber into the mold and curing.

7. The method according to claim 1 wherein said removing step comprises pulling said flexible core to stretch and extract it from an interior of said cured resin impregnated fiber.

8. The method according to claim 1 further comprising embedding inserts in one or more locations to provide assembly and/or mounting features.

9. The method according to claim 1, wherein said flexible core comprises an elastomer.

10. A method of producing a handle, comprising:
    casting a flexible core representation of the handle;
    impregnating a fiber strip with a resin;
    wrapping the resin impregnated fiber strip directly around the cast flexible core representation of the handle;
    providing first and second mold portions with a molding shape in a desired shape configuration to be imparted to the handle;
    placing the resin impregnated fiber strip and flexible core into one of said first and second mould portions;
    moving the first and second mold portions together to a closed position;
    curing the resin impregnated fiber strip; and
    removing the flexible core after the resin impregnated fiber strip is fully cured.

11. The method according to claim 10, further comprising the step of pre-coating surfaces of said first and second mold portions which would contact the resin impregnated fiber strip.

12. The method according to claim 10 further comprising providing a chrome finish to the handle.

13. The method according to claim 10 further comprising providing a metallic finish to the handle.

14. The method according to claim 10 wherein said removing step comprises pulling said flexible core to stretch and extract it from an interior of said cured resin impregnated fiber strip.

15. The method according to claim 10 further comprising providing a color to the handle.

16. The method according to claim 10 further comprising embedding inserts in one or more locations to provide assembly and/or mounting features.

17. A method of producing a handle, comprising:
    forming a resin impregnated material directly around a pre-cast flexible core representation of the handle;
    curing the resin impregnated material in a mold having a desired shape; and
    removing the flexible core after curing is completed, thereby providing a handle.

18. The method according to claim 17 wherein said curing step comprises placing the resin impregnated material into the mold and curing.

19. The method according to claim 17 wherein said removing step comprises pulling said flexible core to extract it from an interior of said cured resin impregnated material.

20. The method according to claim 17, wherein said flexible core comprises an elastomer.

* * * * *